US009187898B1

(12) United States Patent
Underkofler et al.

(10) Patent No.: US 9,187,898 B1
(45) Date of Patent: Nov. 17, 2015

(54) PERIMETER TRIM CLIP FOR SUSPENDED CEILINGS

(71) Applicant: USG Interiors, LLC, Chicago, IL (US)

(72) Inventors: Abraham M. Underkofler, Waukegan, IL (US); Peder J. Gulbrandsen, Aurora, IL (US); Mark R. Paulsen, Waukegan, IL (US)

(73) Assignee: USG INTERIORS, LLC, Chicago, IL (US)

( * ) Notice: Subject to any disclaimer, the term of this patent is extended or adjusted under 35 U.S.C. 154(b) by 0 days.

(21) Appl. No.: 14/494,618

(22) Filed: Sep. 24, 2014

(51) Int. Cl.
*E04B 9/12* (2006.01)
*E04B 9/30* (2006.01)
*E04B 9/06* (2006.01)
*F16B 2/24* (2006.01)

(52) U.S. Cl.
CPC . *E04B 9/30* (2013.01); *E04B 9/064* (2013.01); *F16B 2/241* (2013.01)

(58) Field of Classification Search
CPC ............. E04F 19/02; E04B 9/30; E04B 9/061
USPC ............... 52/506.01, 506.06, 506.07, 506.08, 52/506.09, 506.1, 631, 665, 712; 248/343
See application file for complete search history.

(56) References Cited

U.S. PATENT DOCUMENTS

| 3,677,589 | A | * | 7/1972 | Roles | 403/217 |
| 4,479,341 | A | * | 10/1984 | Schuplin | 52/665 |
| 4,610,562 | A | * | 9/1986 | Dunn | 403/233 |
| 4,715,161 | A | * | 12/1987 | Carraro et al. | 52/714 |
| 5,195,289 | A | * | 3/1993 | LaLonde et al. | 52/506.06 |
| 5,201,787 | A | | 4/1993 | LaLonde et al. | |
| 5,551,792 | A | * | 9/1996 | Witmyer | 403/241 |
| 5,572,844 | A | * | 11/1996 | Stackenwalt et al. | 52/506.07 |
| 5,937,605 | A | * | 8/1999 | Wendt | 52/506.06 |
| D608,619 | S | * | 1/2010 | Gulbrandsen et al. | D8/354 |
| 7,788,875 | B2 | * | 9/2010 | Wendt | 52/712 |
| 8,453,407 | B2 | * | 6/2013 | Tedesco et al. | 52/506.06 |
| 8,615,947 | B2 | * | 12/2013 | Underkofler et al. | 52/506.06 |
| 8,615,948 | B2 | * | 12/2013 | Underkofler et al. | 52/506.07 |
| 8,820,026 | B2 | * | 9/2014 | Underkofler et al. | 52/712 |
| 2014/0215957 | A1 | * | 8/2014 | Underkofler et al. | 52/712 |

FOREIGN PATENT DOCUMENTS

EP  1811098 A1 * 7/2007 ................ E04B 9/12

* cited by examiner

*Primary Examiner* — Brent W Herring
(74) *Attorney, Agent, or Firm* — Pearne & Gordon LLP

(57) ABSTRACT

A perimeter trim attachment clip formed as a single piece sheet metal stamping, the clip having a base, top and bottom rearwardly extending trim engaging grips on the base, the grips having a free edge distal from the base adapted to engage respective top and bottom hems of a perimeter trim channel, a standoff projecting rearwardly of the base beyond the grip edges, the standoff being adapted to abut the side of a grid runner extending parallel along the periphery of a free edge of a ceiling, a squaring tab connected to the base and configured to extend over the parallel extending grid runner and be attached to a reinforcing bulb of a grid runner intersecting the parallel grid runner.

9 Claims, 3 Drawing Sheets

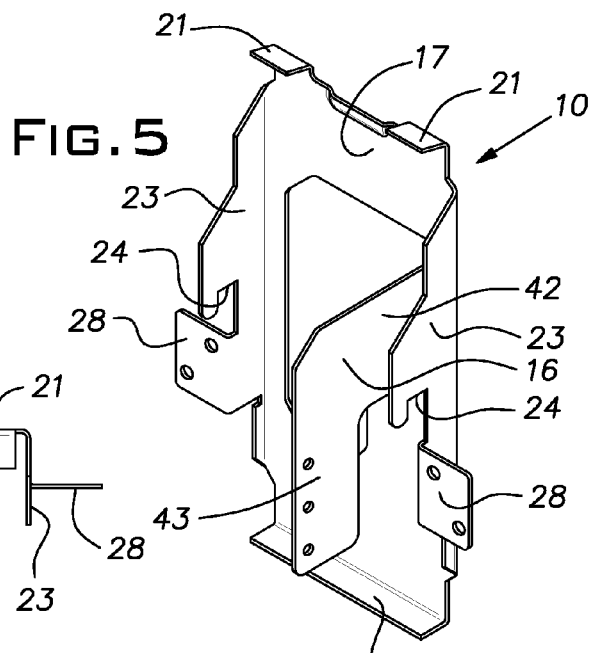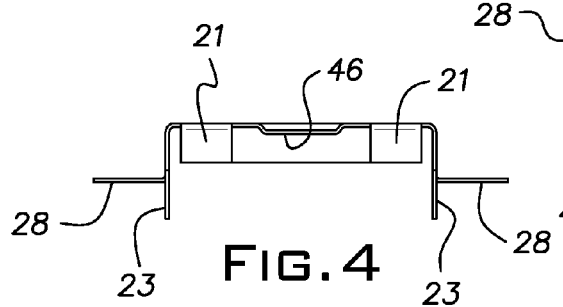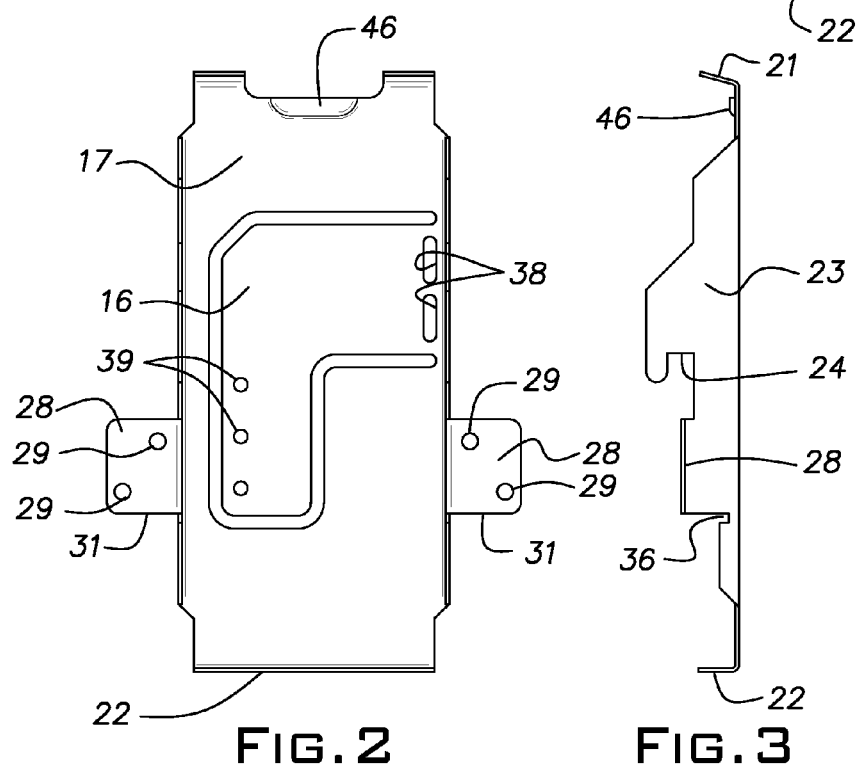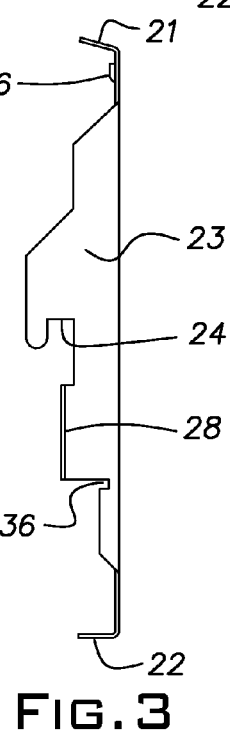

PERIMETER TRIM CLIP FOR SUSPENDED CEILINGS

BACKGROUND OF THE INVENTION

The invention relates to accessories for suspended ceiling grid and, in particular, to a clip for mounting perimeter trim on grid runners.

PRIOR ART

Suspended ceiling islands and peninsulas are commonly constructed at their perimeter or free edge with a factory-produced metal molding or trim. Various clips have been available to attach perimeter trim to standard grid runners. These clips are highly specialized and may be expensive to produce, particularly where they are an assembly of multiple parts. Ceiling panels that extend below the grid runners can require different clips than those used for flush mounted panels. This requirement can result from a ceiling design where the perimeter trim lower edge is desired to be coplanar with the lower face of a downwardly projecting ceiling panel. Torsion spring mounted ceiling panels are examples of such products.

SUMMARY OF THE INVENTION

The invention provides an inexpensive and sturdy sheet metal clip for mounting metal perimeter trim onto a suspended ceiling grid. The disclosed clip is a unitary or single piece stamping that can be quickly and precisely installed to interconnect the perimeter trim to both a parallel grid runner and an intersecting grid runner.

The disclosed clip has hook and slot features that quickly register and provisionally connect with a parallel grid runner. The disclosed spatial relationship of mounting attachment points of a clip to the parallel and intersecting grid runners assures that the perimeter trim will be accurately and securely held in place. A squaring tab, blanked out of the clip sheet metal body, is configured to overlie the adjacent parallel grid runner and be secured directly to an intersecting grid runner. The squaring tab can maintain the clip and, therefore, the perimeter trim attached to the clip in an exact vertical orientation. Preferably, the clip is manufactured and distributed with the squaring tab remaining in a main plane of the clip body so that storage and shipping costs are reduced and an installer is able to carry several clips without contending with a bulky package.

BRIEF DESCRIPTION OF THE DRAWINGS

FIG. 2 is a rear elevational view of the clip of the invention;

FIG. 3 is a side view of the clip of the invention;

FIG. 4 is a top view of the clip of the invention;

FIG. 5 is a rear perspective view of the clip of the invention; and

DESCRIPTION OF THE PREFERRED EMBODIMENT

Figure 1:
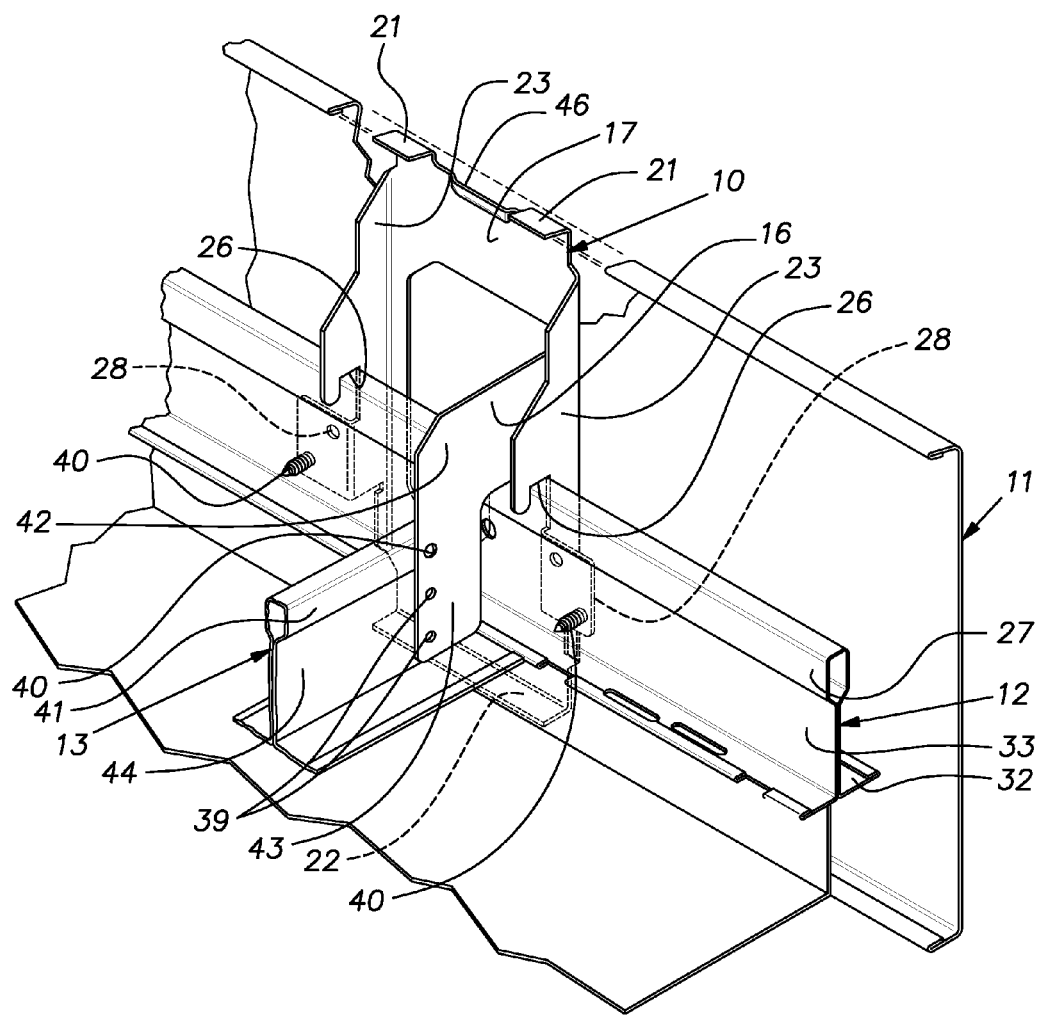
FIG. 1 is a rear perspective view of an exemplary embodiment of a clip of the invention securing a perimeter trim channel to a parallel and an intersecting grid runner.
Figure 6:
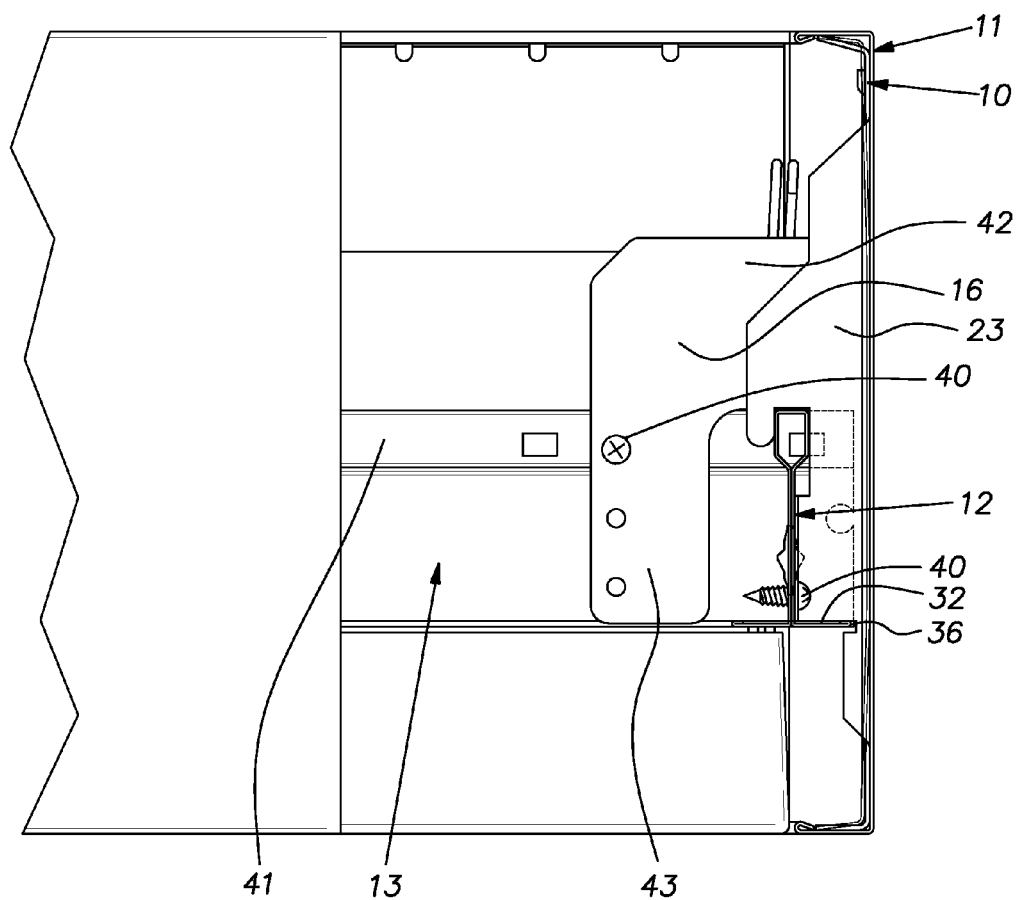
FIG. 6 is a side elevational view of the clip of the invention installed on the parallel and intersecting grid runners and carrying the perimeter trim channel.

A clip 10 embodying a presently preferred form of the invention is shown in FIG. 1. The clip 10 mounts a perimeter trim channel or molding 11 on grid runners 12, 13 representing a suspended ceiling grid of generally conventional construction. Typically, the trim 11 will be installed at a free edge of an island or peninsula ceiling. The clip 10 is a unitary or one-piece article stamped from a single piece of sheet metal, for example 22 gauge hot-dipped galvanized steel. The clip 10 is shown in a finished production form in FIGS. 2-4 where a central part 16, discussed below, is coplanar with the immediately surrounding part of a clip body or base 17. The clip 10, apart from the central part 16, and the area of the base 17 immediately surrounding the central part, is symmetrical about an imaginary central vertical plane.

A pair of laterally spaced grips 21 extend generally rearwardly from an upper edge of the base 17. A single elongate grip 22 extends generally rearwardly from a lower edge of the base 17. A vertical flange 23 extends rearwardly from each side of the base 17. The flanges 23 have an open bottom notch 24 bordered by a depending hook, sized to receive a reinforcing bulb 27 of a grid runner 12 running parallel to the perimeter trim channel 11. Spaced below the notch 24, a predetermined distance, is a foot tab 28 that is in a plane parallel to the base 17. The foot tab 28 has holes 29 for receiving screws used to fix the clip 10 to the parallel grid runner 12. A lower edge 31 of the foot tab 28 is located such that when it rests on the upper surface of a flange 32 of the grid runner 12, the clip 10 is properly vertically positioned relative to the grid runner. The foot tab 28 is spaced relative to the base 17 such that when it abuts an outwardly facing side of a web 33 of the grid runner 12, the clip 10 is properly horizontally located. A small horizontal notch 36 (FIG. 3) in the flange 23 extends vertically from an imaginary horizontal plane projecting from the lower tab edge 31. The notch 36 is located and proportioned to receive the edge of the grid runner flange 32 when the clip 10 is properly positioned on the grid runner 12.

Prior to mounting the clip 10 on the parallel grid runner 12, the central part 16, serving as a squaring tab, is manually bent into a plane perpendicular to the base 17 such that it will be in parallel alignment with the intersecting grid runner 13. A pair of vertical through slots 38 in the body of the base 17 establishes a line of weakness about which the squaring tab 16 will hinge with moderate hand-applied force. The squaring tab 16 has a plurality of holes 39, one of which can be selected for receiving a self-drilling screw 40 to be driven into an aligned reinforcing bulb 41 of the intersecting grid runner 13. The hole 39 selected will depend on the height of the intersecting grid runner 13.

The squaring tab 16 has a right angle configuration comprising a horizontally extending part 42 and a vertically depending part 43. The horizontally extending part 42 enables the squaring tab 16 to bridge over the parallel grid runner 12 while the vertically depending part 43 can abut the reinforcing bulb 41 of the intersecting grid runner 13 and lie beside a web 44 of the intersecting runner.

With the squaring tab 16 bent perpendicularly to the base 17, the clip 10 is installed on the parallel grid runner 12 by hooking the bulb 27 in the notches 24, locating the flange 32 in the slots or notches 36, and fixing the foot tabs 28 to the web 33 with self-drilling screws 40 through selected holes 29 and the web 33. With the base 17 vertical or plumb, a screw 40 is driven through a selected hole 39 in the squaring tab 16 into the reinforcing bulb 41. At least one screw is assembled through a hole 29 in each of the foot tabs 28.

The spatial relationship of the screw fixed points of the two foot tabs 28 and the squaring tab 16 produces a rigid, precisely located support for the perimeter trim 11. The attachment of the horizontal part 42 of the squaring tab 16 to the base 17 immediately adjacent a flange 23 assures a rigid structure in the vertical plane of the squaring tab and flange 23 since flexure of the base, if it occurs, does not affect the rigidity between the squaring tab 16 and adjacent flange 23. The slots 38 are sufficiently close to the adjacent flange 23 that the squaring tab is, for example, within five times the thickness of the sheet stock from which the clip 10 is blanked.

A suspended ceiling grid of an island or peninsula, particularly one in which rectangular metal pan shaped panels are used, typically comprises a plurality of parallel uniformly spaced grid runners 13 intersecting a grid runner 12 extending parallel to the local perimeter. Ordinarily, a clip 10 is installed at each intersecting grid runner 13. With the clips 10 installed on the intersecting grid runners 13 and parallel grid runner 12 as described, the perimeter trim 11 is snapped onto the clips 10. The grips 21, 22 are proportioned to elastically deflect to permit them to fit into the channel-shaped trim 11 where the distal edges of the grips snap behind in-turned hems on flanges of the trim. The grips 21, 22 are proportioned to be resiliently compressed slightly towards one another when fully received within the perimeter trim or channel 11 thereby assuring a snug or interference fit. An embossment 46 on the upper edge of the clip base 17, projecting rearwardly from the plane of the base affords a ledge on which a flat blade screwdriver or other suitable tool can be supported and twisted to lift off the upper flange of the perimeter trim 11 from the upper grips 21, thereby releasing the perimeter trim.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A perimeter trim attachment clip formed as a single piece sheet metal stamping, the clip having a base, top and bottom rearwardly extending trim engaging grips on the base, the grips having a free edge distal from the base adapted to engage respective top and bottom hems of a perimeter trim channel, a standoff projecting rearwardly of the base beyond the grip edges, the standoff being adapted to abut the side of a grid runner extending parallel along the periphery of a free edge of a ceiling, a squaring tab stamped from a central part of the base and connected to the base in a vertical plane at locations spanning a distance substantially greater than a thickness of the sheet metal stamping and configured to extend over the parallel extending grid runner and be attached to a reinforcing bulb of a grid runner intersecting the parallel grid runner.

2. A perimeter trim attachment clip as set forth in claim 1, including a standoff adjacent opposite horizontal extremities of the base for abutting the side of the parallel grid runner.

3. A perimeter trim attachment clip as set forth in claim 2, wherein said standoffs have a hole for receiving a screw for attaching the respective standoff to the parallel grid runner.

4. A perimeter trim attachment clip as set forth in claim 3, wherein said standoffs have a lower edge adapted to abut an upper face of a flange of the parallel grid runner.

5. A perimeter trim attachment clip as set forth in claim 4, wherein the hook and standoff are extensions of a vertical flange extending rearwardly of the base.

6. A perimeter trim attachment clip as set forth in claim 1, including a hook adapted to restrain a reinforcing bulb of a grid runner abutted by the standoff.

7. A perimeter trim attachment clip as set forth in claim 6, wherein said hook is one of a pair of hooks adjacent opposed horizontal extremities of the base.

8. A perimeter trim attachment clip as set forth in claim 1, wherein said squaring tab extends rearwardly of the base at a high elevation adjacent the base enabling the squaring tab to overlie the parallel grid runner to which the clip is attached and a lower elevation distal from the base enabling the squaring tab to be screwed to a side of a grid runner intersecting the parallel grid runner to which the standoff is attached.

9. A perimeter trim attachment clip as set forth in claim 8, wherein the squaring tab has a plurality of vertically spaced holes on said distal portion enabling the squaring tab to be screw attached to a reinforcing bulb of an intersecting grid runner of one of several different heights.

\* \* \* \* \*